(12) United States Patent
Kondrad et al.

(10) Patent No.: US 11,807,084 B1
(45) Date of Patent: Nov. 7, 2023

(54) DETACHABLE PILLAR ASSEMBLY FOR VEHICLE

(71) Applicant: Ford Global Technologies, LLC, Dearborn, MI (US)

(72) Inventors: Marcos Silva Kondrad, Macomb Township, MI (US); Kevin Preuss, Berkley, MI (US); Scott Nydam, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/809,042

(22) Filed: Jun. 27, 2022

(51) Int. Cl.
*B60J 5/04* (2006.01)
*B62D 25/04* (2006.01)

(52) U.S. Cl.
CPC ............ *B60J 5/0479* (2013.01); *B62D 25/04* (2013.01)

(58) Field of Classification Search
CPC ............ B60J 5/06; B60J 5/0479; B62D 25/04
USPC .................... 296/150, 146.9, 146.11, 146.12
See application file for complete search history.

(56) References Cited

U.S. PATENT DOCUMENTS

| | | | | |
|---|---|---|---|---|
| 1,639,037 A | * | 8/1927 | Hollingshead | B60J 5/047 49/365 |
| 1,869,274 A | | 7/1932 | Phillips | |
| 6,332,641 B1 | * | 12/2001 | Okana | B60J 5/043 296/210 |
| 6,860,543 B2 | * | 3/2005 | George | B60J 5/0479 49/248 |
| 7,819,465 B2 | | 10/2010 | Elliot et al. | |
| 8,419,117 B2 | | 4/2013 | Stephens | |
| 10,906,496 B2 | * | 2/2021 | Baccouche | B60R 21/213 |
| 11,365,578 B2 | * | 6/2022 | Bakos | E05F 15/611 |
| 2004/0256872 A1 | | 12/2004 | Piper et al. | |
| 2006/0125284 A1 | * | 6/2006 | Kristl | B60J 5/0477 296/146.11 |

* cited by examiner

*Primary Examiner* — Dennis H Pedder
(74) *Attorney, Agent, or Firm* — Vichit Chea; Carlson, Gaskey & Olds, P.C.

(57) ABSTRACT

A vehicle assembly includes a front door of a vehicle, a detachable pillar assembly, and a rear door that is aft the front door along a longitudinal axis of the vehicle. The rear door is configured to selectively pivotably couple to the detachable pillar assembly. A method of providing an opening to a vehicle includes detaching a pillar assembly from a structure of a vehicle, and pivoting a rear door of a vehicle together with the pillar assembly from a closed position to an open position. The rear door pivots relative to the pillar assembly when the pillar assembly is latched to the vehicle.

18 Claims, 5 Drawing Sheets

DETACHABLE PILLAR ASSEMBLY FOR VEHICLE

TECHNICAL FIELD

This disclosure relates generally to pillars of a vehicle and, more particularly, to a pillar that can be unlatched from a body structure of the vehicle.

BACKGROUND

Vehicles can include support pillars, such as vertical, body-mounted pillars, to support and strengthen the vehicle. Vertical, body-mounted support pillars can also facilitate continuous sealing between a body structure of the vehicle and doors of the vehicle.

SUMMARY

In some aspects, the techniques described herein relate to a vehicle assembly, including: a front door of a vehicle; a detachable pillar assembly; and a rear door that is aft the front door along a longitudinal axis of the vehicle, the rear door configured to selectively pivotably couple to the detachable pillar assembly.

In some aspects, the techniques described herein relate to a vehicle assembly, wherein the detachable pillar assembly is attachable to a body structure of the vehicle, and the rear door is pivotably coupled to the detachable pillar assembly when the rear door is configured as a forward opening door.

In some aspects, the techniques described herein relate to a vehicle assembly, wherein the detachable pillar assembly is latched to the rear door, and the rear door is pivotably coupled to the body structure of the vehicle when the rear door is configured as a rearward opening door.

In some aspects, the techniques described herein relate to a vehicle assembly, wherein the rear door is pivotably coupled adjacent an aft side of a rear door opening when the rear door is configured as a rearward opening door.

In some aspects, the techniques described herein relate to a vehicle assembly, wherein the detachable pillar assembly attaches to the body structure through at least one latch.

In some aspects, the techniques described herein relate to a vehicle assembly, further including a quick-connect electrical connector that electrically couples the detachable pillar assembly to the vehicle when the detachable pillar assembly is latched to the body structure.

In some aspects, the techniques described herein relate to a vehicle assembly, wherein the detachable pillar assembly includes a frame, the detachable pillar assembly and the frame circumscribing an opening to a passenger compartment of the vehicle.

In some aspects, the techniques described herein relate to a vehicle assembly, wherein the frame is pivotably coupled to a body structure of a vehicle adjacent an aft side of the opening.

In some aspects, the techniques described herein relate to a vehicle assembly, wherein the rear door is pivotable relative to the frame of the detachable pillar assembly when the rear door is pivotably coupled to the detachable pillar assembly.

In some aspects, the techniques described herein relate to a vehicle assembly, wherein the rear door pivots relative to the detachable pillar assembly when configured as a forward opening door, wherein the rear door pivots together with the detachable pillar assembly when configured as a rearward opening door.

In some aspects, the techniques described herein relate to a vehicle assembly, further including a hinge assembly that pivotably couples the rear door and the frame to the vehicle, the rear door electrically coupled to the vehicle through the hinge assembly.

In some aspects, the techniques described herein relate to a vehicle assembly, further including a bar link assembly, the rear door coupled to the vehicle through the bar link assembly that selectively pivotably couples the rear door to a body structure of the vehicle at a position aft a rear door opening of the vehicle.

In some aspects, the techniques described herein relate to a vehicle assembly, wherein the rear door is configured to transition from a closed position to an open position using the bar link assembly while the front door is in a closed position.

In some aspects, the techniques described herein relate to a vehicle assembly, wherein the detachable pillar assembly is coupled to the rear door when the rear door is configured as a rearward opening door and when the rear door is transitioned back-and-forth between a closed position to an open position.

In some aspects, the techniques described herein relate to a vehicle assembly, wherein a passenger compartment of the vehicle is configured to accommodate rearward facing passengers.

In some aspects, the techniques described herein relate to a vehicle assembly, wherein the detachable pillar assembly is a detachable vertical, body-mounted pillar assembly.

In some aspects, the techniques described herein relate to a vehicle assembly, wherein the detachable pillar assembly is configured to transition between a latched position where the detachable pillar assembly is latched to a body structure of the vehicle, and an unlatched position where the detachable pillar assembly is unlatched from the body structure and moves with the rear door between an open position and closed position when the rear door is configured as a rear door.

In some aspects, the techniques described herein relate to a vehicle assembly, including, a front door of a vehicle, a detachable pillar assembly, a rear door that is aft the front door along a longitudinal axis of the vehicle, and a bar link assembly. The front door is pivotably coupled to the vehicle through the bar link assembly. The front door is configured to transition from a closed position to an open position with the detachable pillar assembly while the rear door is in a closed position.

In some aspects, the techniques described herein relate to a method of providing an opening to a vehicle, including: detaching a pillar assembly from a structure of a vehicle; and pivoting a rear door of a vehicle together with the pillar assembly from a closed position to an open position, the rear door pivoting relative to the pillar assembly when the pillar assembly is latched to the vehicle.

In some aspects, the techniques described herein relate to a method, wherein the rear door is configured to pivot from the closed position to the open position when a front door of the vehicle is in a closed position.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details vehicles having a detachable pillar assembly. A door of the vehicle can be configured as a forward opening door where the door pivots forward to an open position relative to the detachable pillar assembly. The door can alternatively be configured as a rearward opening door where the door pivots rearward.

Figure 1:
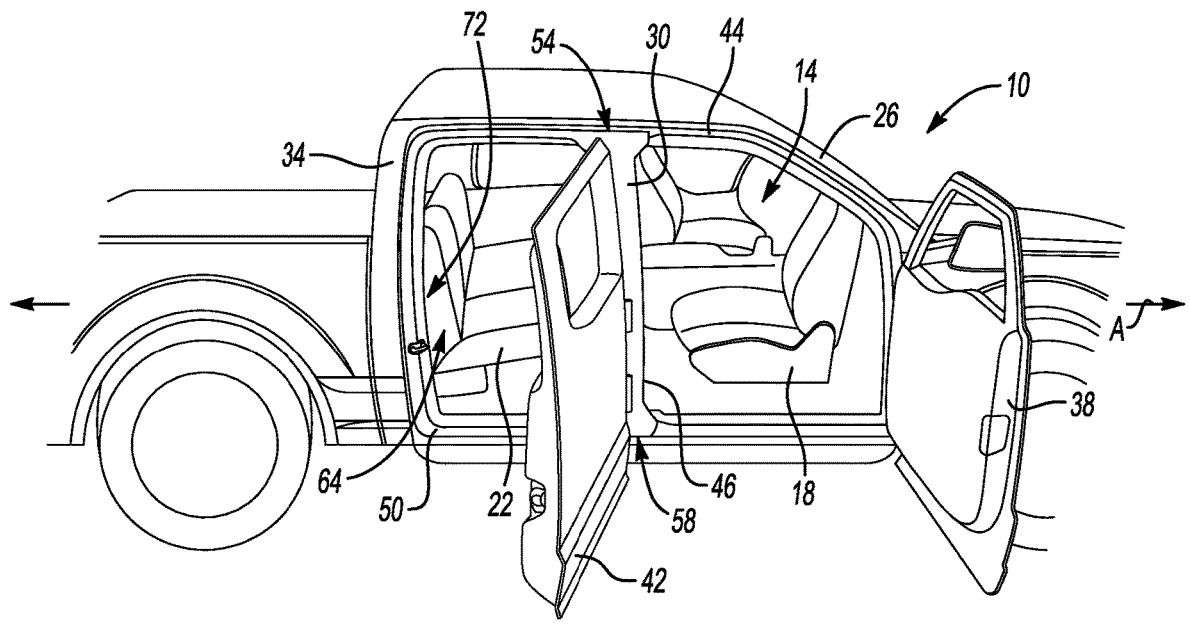
FIG. 1 illustrates a side view of a vehicle having a detachable pillar assembly and a rear door when the rear door is configured as a forward opening door and pivoted to an open position according to an exemplary embodiment.
Figure 2:
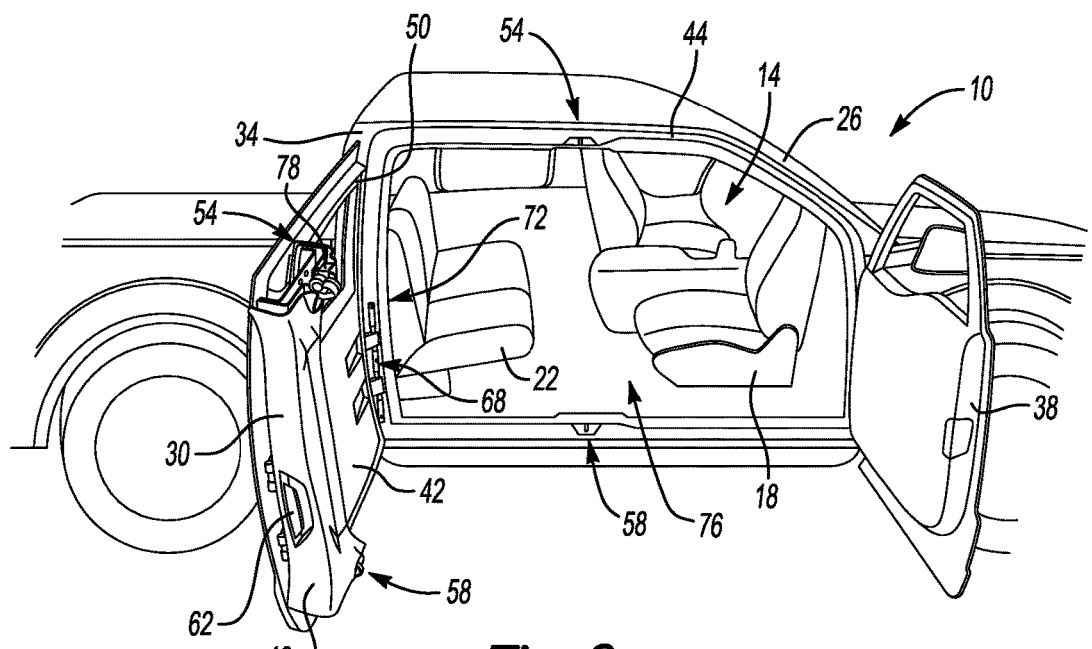
FIG. 2 illustrates the side view of the vehicle of FIG. 1 having the rear door configured as a rearward opening door and pivoted to an open position.
Figure 3:
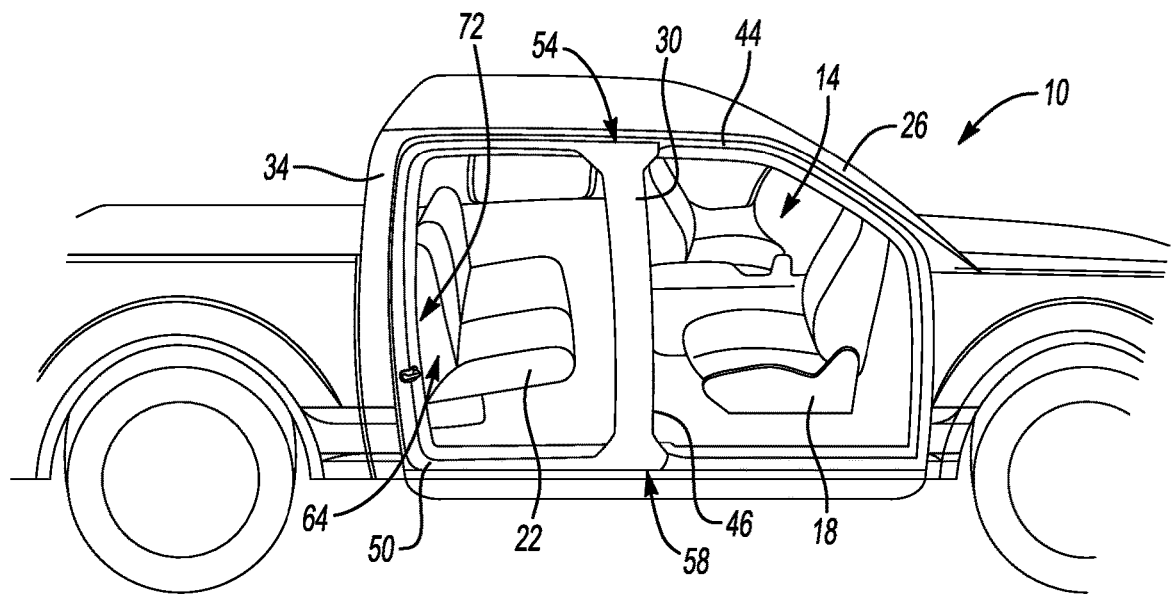
FIG. 3 illustrates the side view of the vehicle of FIG. 1 with the rear door removed to show the detachable pillar assembly of the vehicle in a closed position.

With reference to FIGS. 1-3, a vehicle 10 includes a passenger compartment 14 having rearward facing seats 18 and forward facing seats 22. Forward and rearward, front and rear, etc. are with reference to an orientation of the vehicle 10. The vehicle 10 can be an electrified, autonomous vehicle. The rearward facing seats 18 can accommodate rearward facing passengers, and the forward facing seats 22 can accommodate forward facing passengers.

The vehicle 10 further includes an A-pillar assembly 26, a detachable, vertical, body-mountable pillar assembly 30, a C-pillar assembly 34, a front door 38, and a rear door 42. The front door 38 and the rear door 42 are side doors. The rear door 42 is aft the front door along a longitudinal axis A of the vehicle 10.

The A-pillar assembly 26 and the C-pillar assembly 34 are part of a body structure 44 of the vehicle 10. The detachable pillar assembly 30 can attach to the body structure 44 as shown in FIGS. 1 and 3, and can detach from the vehicle 10 as shown in FIG. 2. The detachable pillar assembly 30 is thus able to move back-and-forth between a latched position and an unlatched position. When latched, the detachable pillar assembly 30 assembly can be considered part of the body structure 44. The detachable pillar assembly 30, in this example, includes a pillar 46 and a frame 50.

In FIG. 1, the detachable pillar assembly 30 is shown in a latched position where a first latch assembly 54 and a second latch assembly 58 attach the detachable pillar assembly 30 to the body structure 44. A user can, in some examples, actuate a handle 62 to unlatch the first latch assembly 54 and the second latch assembly 58 from the body structure 44.

When the detachable pillar assembly 30 is latched to the vehicle 10 and the rear door 42 is open as shown in FIG. 1, the pillar 46 and the frame 50 of the detachable pillar assembly 30 establish an opening 64 that a user can use to enter and exit a rear of the passenger compartment 14. The detachable pillar assembly 30 and the frame 50 circumscribing the opening 64 to the passenger compartment 14 in this example.

The rear door 42 is pivotably coupled to the pillar 46 of the detachable pillar assembly 30 when the rear door 42 is configured as a forward opening door. With the detachable pillar assembly 30 remaining latched to the body structure 44 as shown in FIGS. 1 and 3, the rear door 42 can pivot about the pillar 46 back and forth between the open position shown in FIG. 1 and a closed position where the rear door 42 covers the opening 60.

The rear door 42 can be pivotably coupled to the body structure 44 through the frame 50 of the detachable pillar assembly 30 to reconfigure the rear door 42 as a rearward opening door. The frame 50 is directly pivotably attached to the body structure 44 through a rear hinge assembly 68 (FIG. 2). The pivoting occurs adjacent and aft side 72 of a passenger compartment opening 76 when the rear door 42 is configured as a rearward opening door. A person having skill in this art and the benefit of this disclosure could understand how to selectively pivotably couple a frame to a body structure.

When the rear door 42 is configured as a rearward opening door, the first latch assembly 54 and the second latch assembly 58 are unlatched so that the detachable pillar assembly 30 can detach from the body structure 44 and pivot about the rear hinge assembly 68 together with the rear door 42 as the rear door 42 is moved to the open position of FIG. 2. The detachable pillar assembly 30 can connect to the rear door 42 through other latches when the rear door 42 is configured as a rearward opening door.

As can be appreciated, moving the detachable pillar assembly 30 while opening the rear door 42 and then opening the front door 38 can provide the passenger compartment opening 76 large opening to access the passenger compartment 14 as shown in FIG. 2. The opening can be particularly useful when entering and exiting rearward facing seats 18.

A quick-connect electrical connector assembly 78 can electrically couple the detachable pillar assembly 30 to the vehicle 10 when the rear door 42 is configured as a forward opening door. When the rear door 42 is configured as a rearward opening door, the quick-connect electrical connector assembly 78 can be disconnected and the rear door 42 electrically connected to the vehicle 10 through the rear hinge assembly 68.

In this disclosure, like reference numerals designate like elements where appropriate, and reference numerals with the addition of one-hundred or multiples thereof designate modified elements. The modified elements incorporate the same features and benefits of the corresponding modified elements, expect where stated otherwise.

Figure 4:
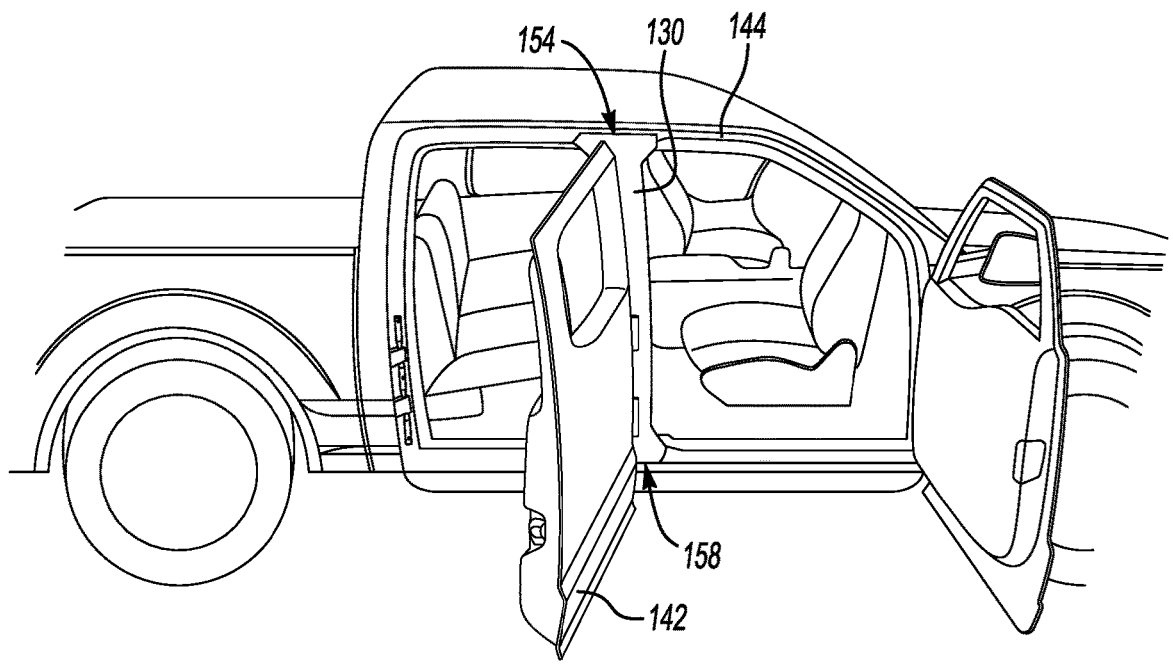
FIG. 4 illustrates a side view of a vehicle having a detachable pillar assembly and a rear door when the rear door is configured as a forward opening door and is pivoted to an open position according to another exemplary embodiment of the present disclosure.
Figure 5:
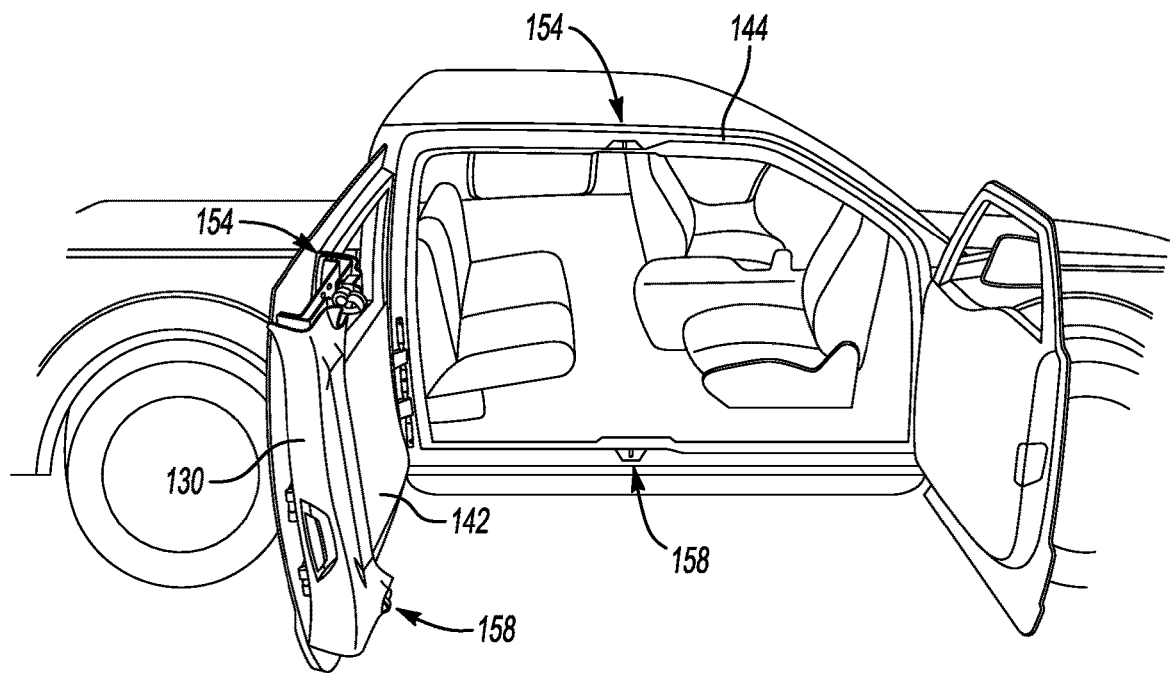
FIG. 5 illustrates the side view of the vehicle of FIG. 4 having the rear door configured as a rearward opening door and pivoted to an open position.

With reference now to FIGS. 4 and 5, another example detachable pillar assembly 130 lacks a structure resembling the frame 50. Like the detachable pillar assembly 30 of FIGS. 1-3, the detachable pillar assembly 130 can selectively attach to the body structure 144 via a first latch assembly 154 and a second latch assembly 158.

A rear door 142 can be configured as a forward opening door as shown in FIG. 4 where the rear door 142 is pivotably coupled to the detachable pillar assembly 130 when the detachable pillar assembly 130 is latched to the body structure 144 of a vehicle.

The rear door 142 can be reconfigured as a rearward opening door as shown in FIG. 5. When configured in this way, the rear door 142 is pivotably coupled to the body structure 144 and can pivot back-and-forth between a closed position and the open position of FIG. 5.

When the rear door 142 is configured as a rearward opening door, the detachable pillar assembly 130 can unlatch from the body structure 144 and move with the rear door 142 back-and-forth between the closed position and the open position of FIG. 5. With the front door 138 also open as shown in FIG. 5, an opening 158 to the passenger compartment 114 is not obstructed the detachable pillar assembly 130.

Figure 6:
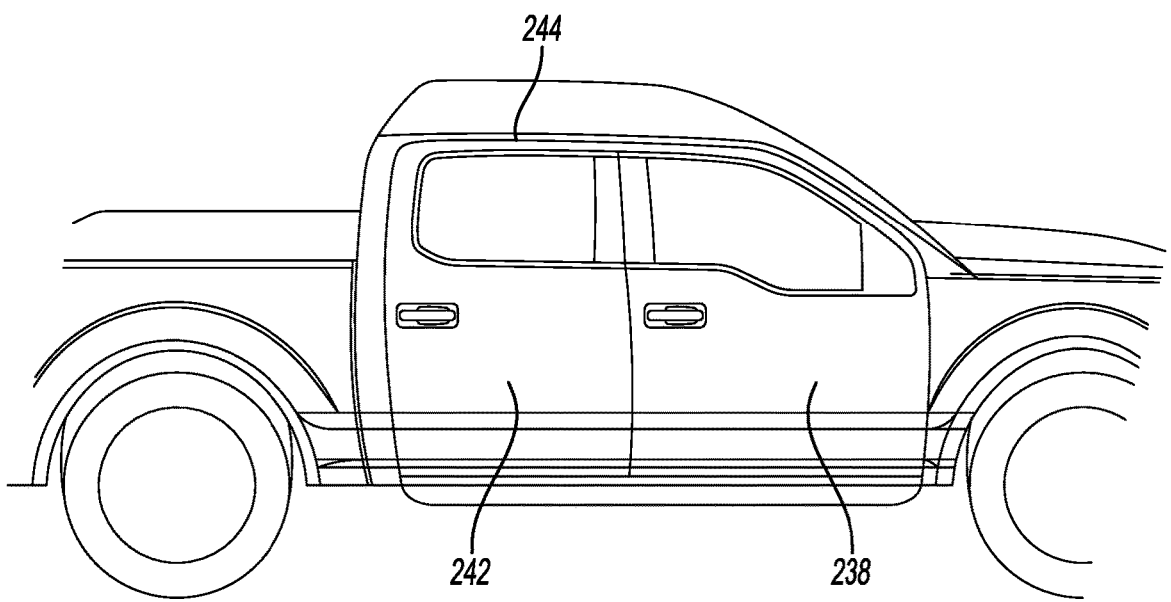
FIG. 6 illustrates a side view of a vehicle having a detachable pillar assembly according to yet another exemplary environment when the rear door is in a closed position.

With reference to FIGS. 6 to 9, a rear door 242 can be configured as a forward opening door and can pivot back-and -forth between the closed position of FIG. 6 and an open position similar to the rear door 142 of FIGS. 4 and 5.

Figure 7:
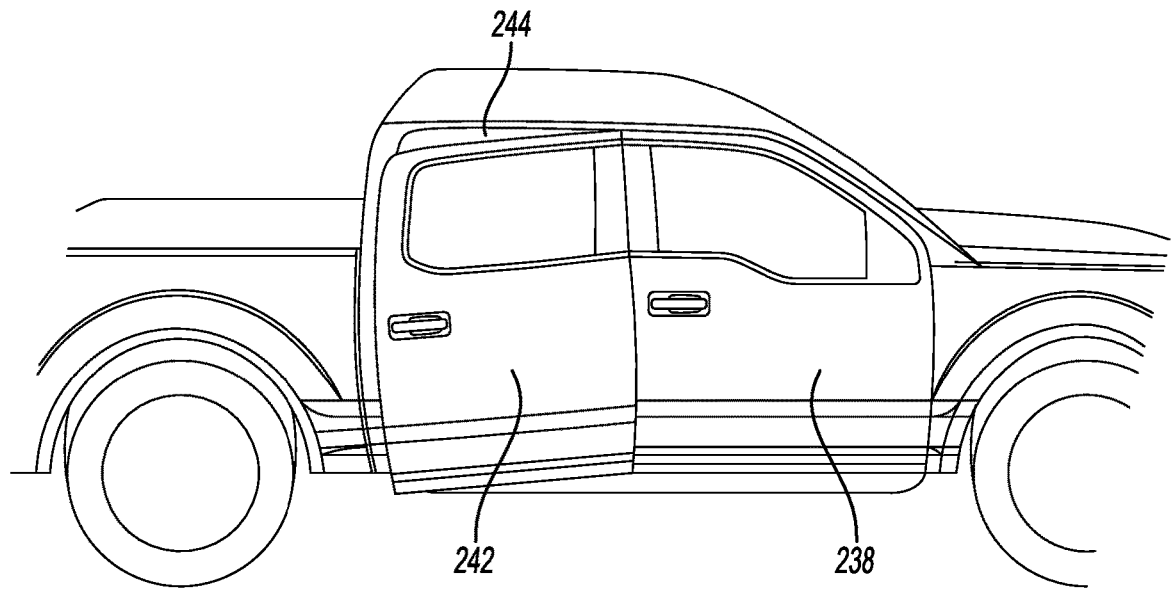
FIG. 7 illustrates the side view of the vehicle of FIG. 6 having the rear door configured as a rearward opening door and transitioning from the closed position toward and open position.
Figure 8:
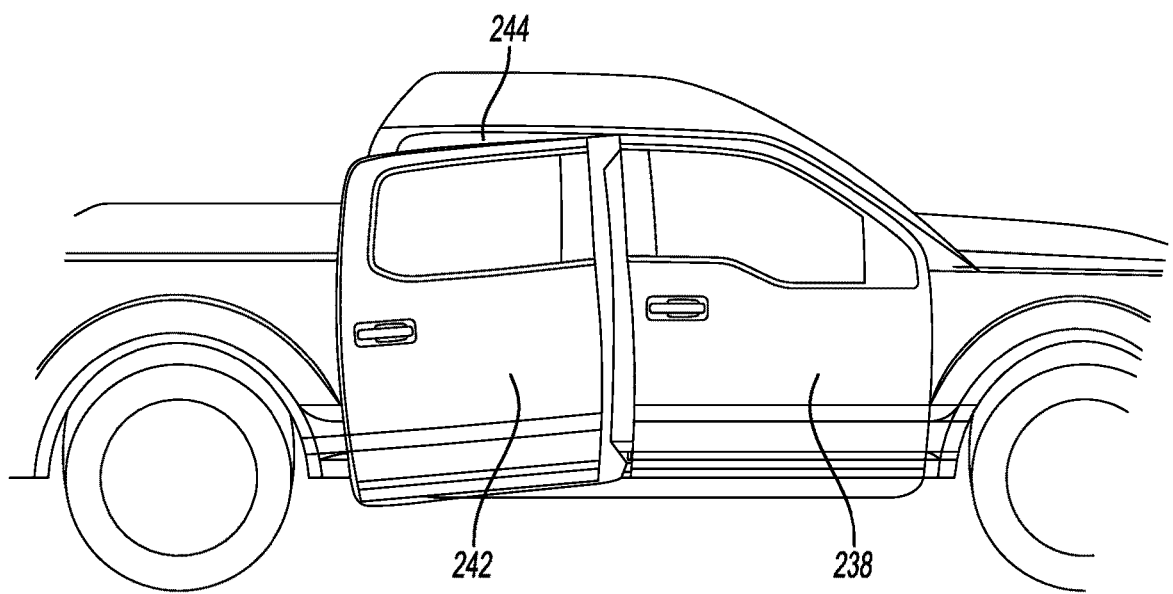
FIG. 8 illustrates the side view of the vehicle of FIG. 7 showing the rear door transitioned even further from the closed position than is shown in FIG. 7.
Figure 9:
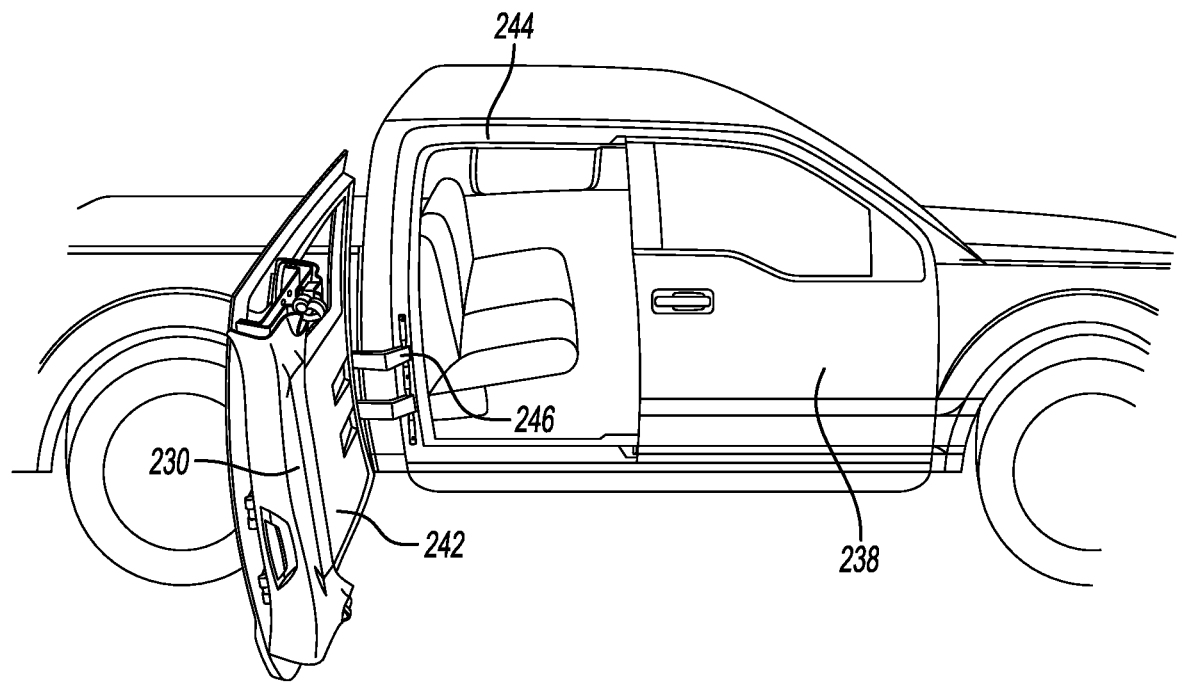
FIG. 9 illustrates the side view of the vehicle of FIG. 7 with the rear door transitioned to the open position.

The rear door 242, when configured as a rearward opening door, is pivotably coupled to a body structure 244 via a bar-link assembly, here a four-bar link assembly 246 (FIG. 9). The bar-link assembly permits transitioning the rear door 242 from a closed position to an open position while the front door 238 remains in a closed position as shown in FIG. 7 to FIG. 9. When opening the rear door 242, the four-bar link assembly 246 permits an aft end of the rear door 242 to move laterally outward as shown in FIG. 7. The rear door 242 can then slide rearward to draw the detachable pillar assembly 230 out from behind the front door 238 as shown in FIG. 8. The rear door 242 can then be pivoted outward as shown in FIG. 9.

In another example, the four-bar link assembly 246 is instead used to pivotably couple the front door 238 to the body structure 244. In such an example, the rear door 242 remains a rear opening door and does not pivotably couple to the detachable pillar assembly 230. The four-bar link assembly 246 can permit the forward end of the front door 238 to move laterally outward. The front door 238 can then slide forward to draw the detachable pillar assembly 230 out from behind the rear door 242. The rear door 242 can then pivot outward, if desired.

Figure 10:
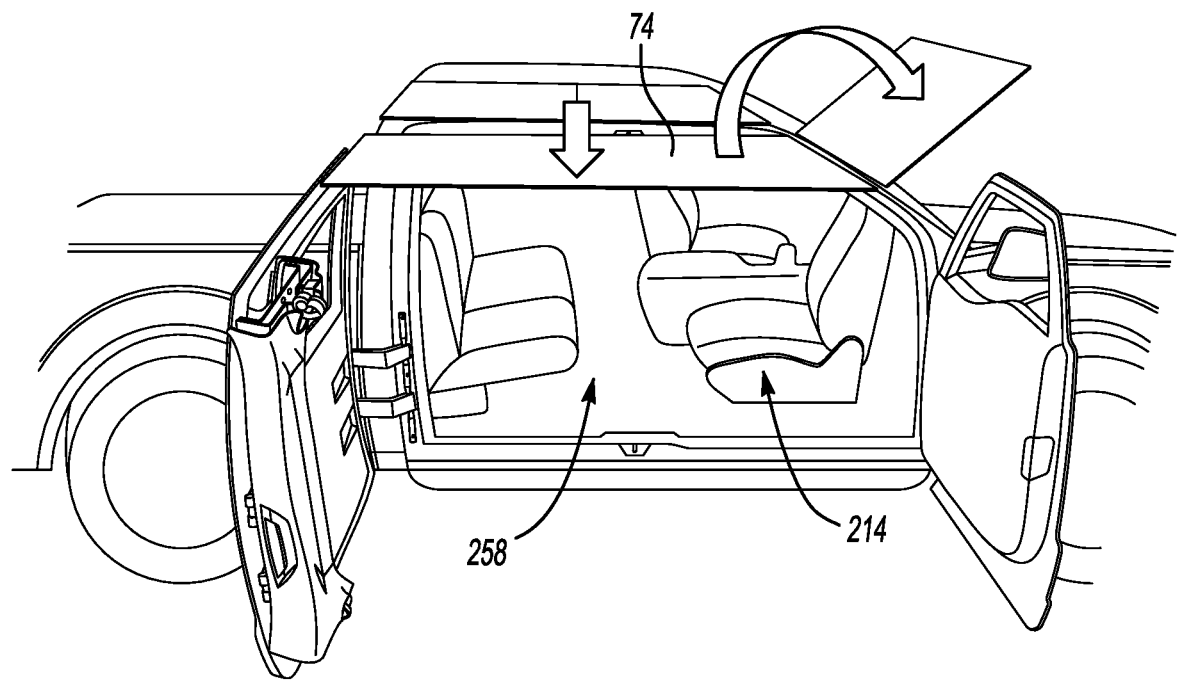
FIG. 10 illustrates a side view of a vehicle having a shade assembly that can be used with any of the vehicles in the embodiments of FIGS. 1-9.

With reference to FIG. 10, a canopy 74 can be unfolded to shield areas near an opening 258 to the passenger compartment 214, for example. The canopy 74 can be used to shield users when camping or attending sporting events. The canopy 74 is shown used in combination with the embodiment of FIGS. 6-9, but is usable with any of the embodiments of this disclosure.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A vehicle assembly, comprising:
   a front door of a vehicle;
   a detachable pillar assembly, the detachable pillar assembly including a frame and a pillar, the pillar and the frame circumscribing an opening to a passenger compartment of the vehicle; and
   a rear door that is aft the front door along a longitudinal axis of the vehicle, the rear door configured to selectively pivotably couple to the detachable pillar assembly.

2. The vehicle assembly of claim 1, wherein the detachable pillar assembly is latched to a body structure of the vehicle when the rear door is configured as a forward opening door, and the rear door is pivotably coupled to the detachable pillar assembly when the rear door is configured as a forward opening door.

3. The vehicle assembly of claim 2, wherein the detachable pillar assembly is latched to the rear door when the rear door is configured as a rearward opening door, and the rear door is pivotably coupled to the body structure of the vehicle when the rear door is configured as a rearward opening door.

4. The vehicle assembly of claim 3, wherein the rear door is pivotably coupled adjacent an aft side of a rear door opening when the rear door is configured as a rearward opening door.

5. The vehicle assembly of claim 2, wherein the detachable pillar assembly attaches to the body structure through at least one latch.

6. The vehicle assembly of claim 2, further comprising a quick-connect electrical connector that electrically couples the detachable pillar assembly to the vehicle when the detachable pillar assembly is latched to the body structure.

7. The vehicle assembly of claim 1, wherein the frame is pivotably coupled to a body structure of a vehicle adjacent an aft side of the opening.

8. The vehicle assembly of claim 1, wherein the rear door is pivotable relative to the frame of the detachable pillar assembly when the rear door is pivotably coupled to the detachable pillar assembly.

9. The vehicle assembly of claim 1, wherein the rear door pivots relative to the detachable pillar assembly when configured as a forward opening door, wherein the rear door pivots together with the detachable pillar assembly when configured as a rearward opening door.

10. The vehicle assembly of claim 1, further comprising a hinge assembly that pivotably couples the rear door and the frame to the vehicle, the rear door electrically coupled to the vehicle through the hinge assembly.

11. The vehicle assembly of claim 1, further comprising a bar link assembly, the rear door coupled to the vehicle through the bar link assembly that selectively pivotably couples the rear door to a body structure of the vehicle at a position aft a rear door opening of the vehicle.

12. The vehicle assembly of claim 11, wherein the rear door is configured to transition from a closed position to an open position using the bar link assembly while the front door is in a closed position.

13. The vehicle assembly of claim 1, wherein the detachable pillar assembly is coupled to the rear door when the rear door is configured as a rearward opening door and when the rear door is transitioned back-and-forth between a closed position to an open position.

14. The vehicle assembly of claim 1, wherein a passenger compartment of the vehicle is configured to accommodate rearward facing passengers.

15. The vehicle assembly of claim 1, wherein the detachable pillar assembly is a detachable vertical, body-mounted pillar assembly.

16. The vehicle assembly of claim 1, wherein the detachable pillar assembly is configured to transition between a latched position where the detachable pillar assembly is latched to a body structure of the vehicle, and an unlatched position where the detachable pillar assembly is unlatched from the body structure and moves with the rear door between an open position and closed position when the rear door is configured as a rearward opening door.

17. A vehicle assembly, comprising:
a front door of a vehicle;
a detachable pillar assembly;
a rear door that is aft the front door along a longitudinal axis of the vehicle; and
a bar link assembly, the rear door pivotably coupled to the vehicle through the bar link assembly, the rear door configured to transition from a closed position to an open position with the detachable pillar assembly while the front door is in a closed position.

18. A method of providing an opening to a vehicle, comprising:
detaching a pillar assembly from a structure of a vehicle; and
pivoting a rear door of a vehicle together with the pillar assembly from a closed position to an open position, the rear door pivoting relative to the pillar assembly when the pillar assembly is latched to the vehicle, wherein the rear door is configured to pivot from the closed position to the open position together with the pillar assembly when a front door of the vehicle is in a closed position.

* * * * *